April 16, 1940. W. F. GRUPE Re. 21,424
METHOD OF PRODUCING BOX OR CARTON BLANKS BEARING PRINTED MATTER AND RESULTING PRODUCT
Original Filed May 14, 1934 2 Sheets-Sheet 1
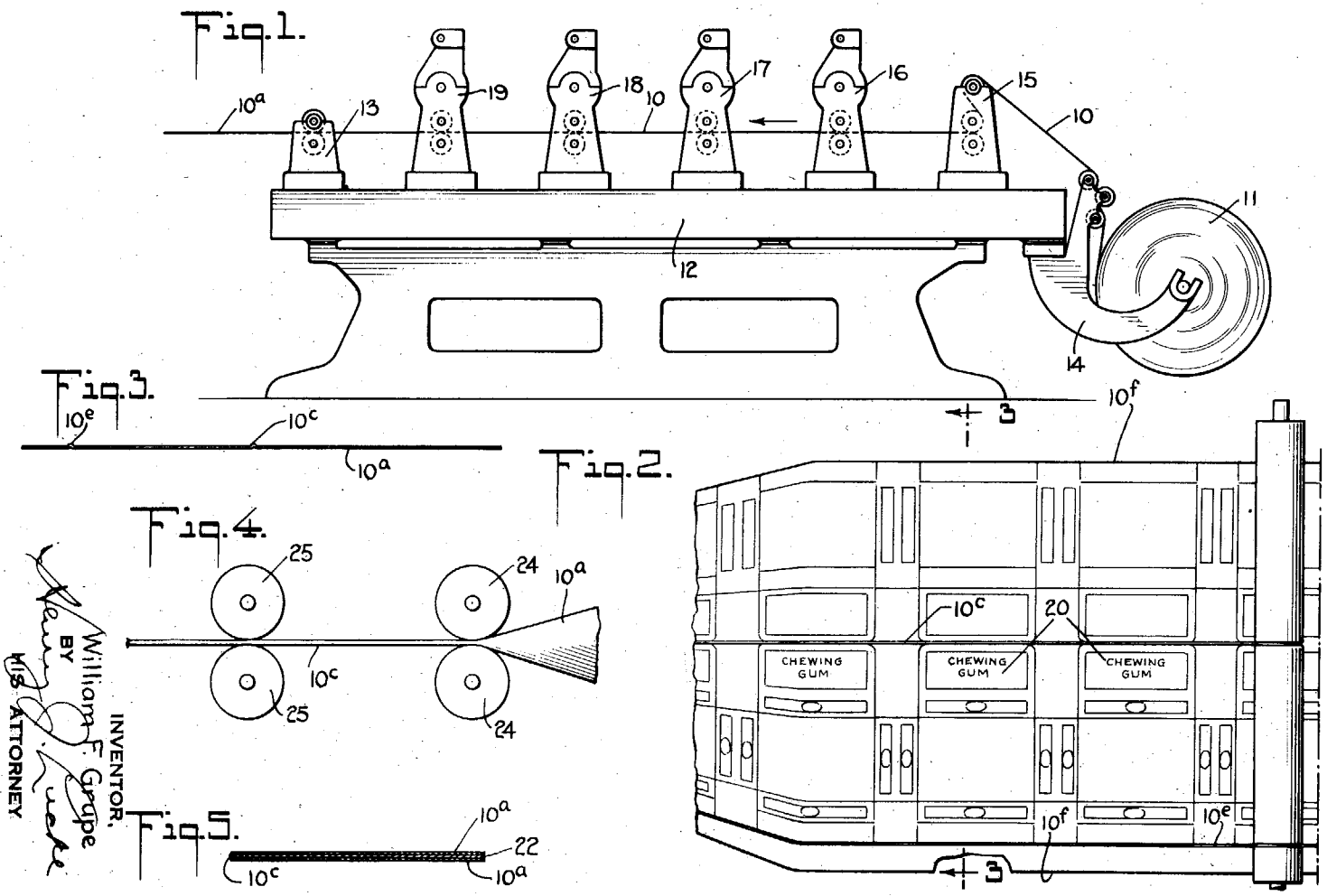
INVENTOR,
William F. Grupe
BY
Henry J. Lucke
HIS ATTORNEY April 16, 1940. W. F. GRUPE Re. 21,424
METHOD OF PRODUCING BOX OR CARTON BLANKS BEARING PRINTED MATTER AND RESULTING PRODUCT
Original Filed May 14, 1934 2 Sheets-Sheet 2
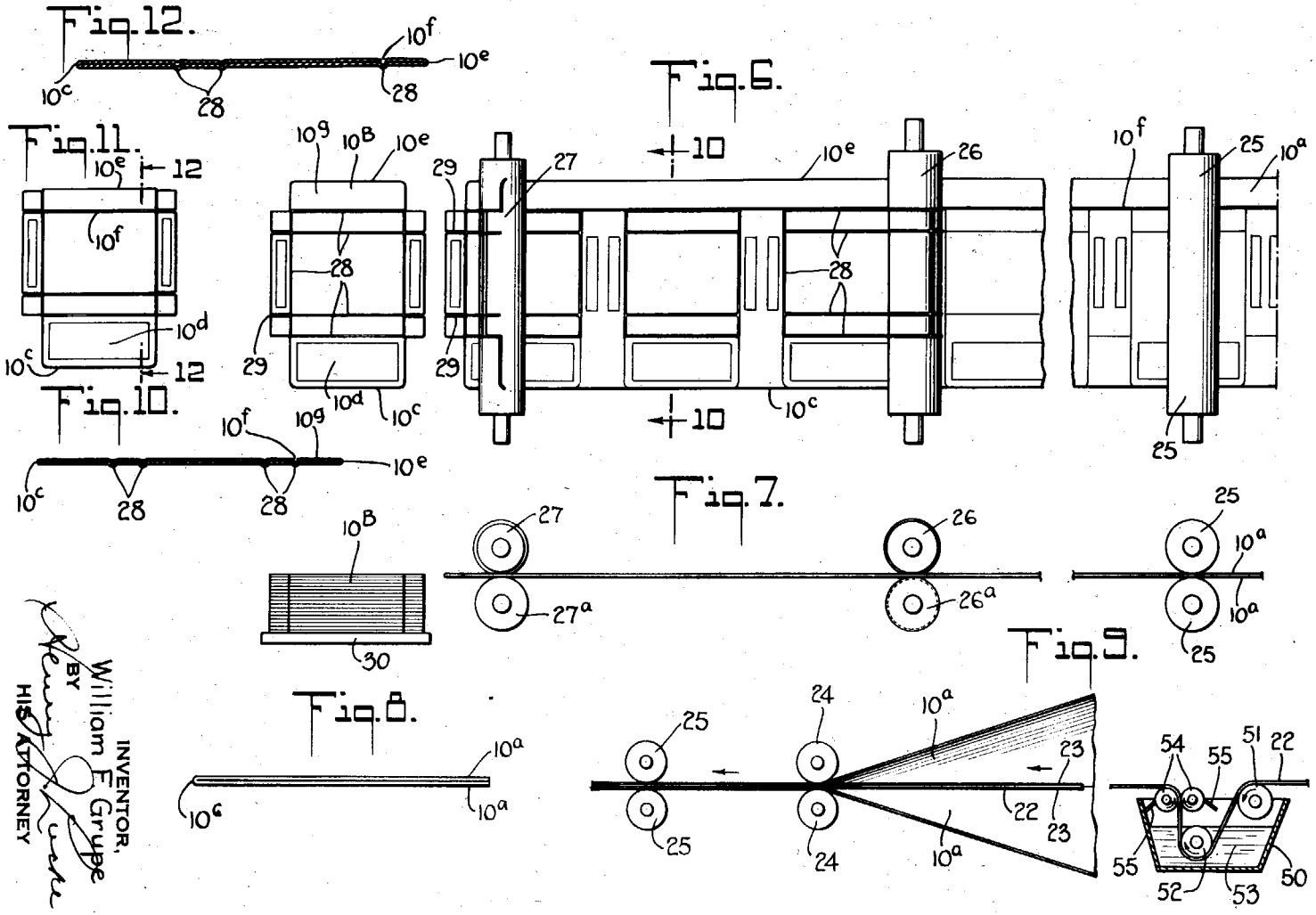
INVENTOR,
William F. Grupe
BY
Henry J. Lucke
HIS ATTORNEY Reissued Apr. 16, 1940

Re. 21,424

UNITED STATES PATENT OFFICE 21,424

METHOD OF PRODUCING BOX OR CARTON BLANKS BEARING PRINTED MATTER AND RESULTING PRODUCT

William F. Grupe, Lyndhurst, N. J., assignor to Chambon Corporation, Garfield, N. J., a corporation of New York Original No. 2,048,693, dated July 28, 1936, Serial No. 725,582, May 14, 1934. Application for reissue June 13, 1938, Serial No. 213,460

19 Claims. (Cl. 93—36.6)

My invention relates to an improved method of producing box or carton blanks, and also to the resulting box or carton.

An object of my invention is to economically produce box or carton blanks of improved appearance and finish.

An object of my invention is to produce box or carton blanks, bearing printed matter on opposing faces, in a manner whereby substantially absolute register of the printed matter is obtained. Usually, such printed matter includes marginal or other outline impressions as well as advertising and other printed impressions, my invention attaining register of such marginal or other outline impressions as well as aligned and positioned relationship of the advertising and other printed impressions relative to the configuration of the box or carton when set up.

My invention is applicable to boxes or cartons formed from integral stock.

My invention is particularly applicable to boxes and cartons embodying a fly leaf which is integral with the body of the blank.

In carrying out my invention, the printed matter is impressed in such number of varied colors and other impressions as may be desired to provide impressions on opposing faces of the box or carton as well as upon the fly leaf, if so desired. The printed matter, inclusive of the maximum number of desired colors and/or other impressions pursuant to the preferred forms of my invention, are applied upon but one face of the web.

More specifically, a preferred form of my process comprises the feeding of a web through a suitable printing machine capable of impressing the desired printed matter in the desired number of colors upon one face of the web, the width of the web being substantially twice that of the final blank, inclusive of the fly leaf, if any, the resulting single face imprinted web being then suitably folded upon itself, accompanied by the application of adhesive to bind the non-impressed faces of the web to one another as a composite web, and then blanking out such composite web in accordance with the outline of the desired box or carton, the resultant blank being the box or carton in flat or collapsed status.

Another embodiment of my invention provides an insert ply of cardboard or relatively inexpensive, and therefore unfinished, sheet material which may also be in web form, the imprinted web being applied upon opposing faces of such insert ply.

The most preferred form of my invention, as to process, comprises the step of folding the printed web oppositely upon itself at both sides, to thereby locate the original side edges of the web within the resulting side edges of the folded web, the original side edges advantageously being located along a line of longitudinal folding or scoring. Accordingly, boxes and cartons and the like thus produced by my process possess the further distinctive advantage that the edges located at the thus oppositely folded web are "rounded" and finished as distinguished from severed, and therefore unfinished, edges. Such most preferred form of my invention is especially advantageous in the production of boxes or cartons embodying a fly leaf at one or both sides of the box or carton blank, the original impressed web being in width substantially twice that of the resulting box or carton blank.

My invention also affords the control of the flexibility of a multiple ply by proper selection of the bonding medium for bonding the folded web, either directly at its folded reverse face or upon opposite faces of an insert ply, such flexibility control being had, as for example, by adding glycerine or other ingredient of proper viscosity to the glue or other bonding medium. The resulting multiple ply, embodying such glycerine or equivalent in the residue bonding medium, possesses a degree of flexibility controlled by the proper selection and proper proportion of the flexibility-controlling ingredient of the bonding medium.

Further features and objects of the invention will be more fully understood from the following detail description and the accompanying drawings, in which Fig. 1 is a side elevation, largely diagrammatic, illustrating the step of passing a web of the material to be impressed through the indicated printing stage. This view also indicates the supplemental stage of scoring the web lengthwise to faciliate the later operation of folding the web.

Fig. 2 is a detail view, on an enlarged scale, in plan of a portion of the impressed and scored web derived by the steps indicated in Fig. 1.

Fig. 3 is a detail vertical transverse section on line 3—3 of Fig. 2.

Fig. 4 is a side elevation, illustrating the step of folding the impressed web upon itself.

Fig. 5 is a transverse vertical section of the blank resulting upon folding the impressed web on opposite faces of an insert ply.

Fig. 6 is a top plan view, largely diagrammatic, showing an impressed web folded pursuant to either Fig. 4 or 5, in transit to and at the stage of blanking out the folded web to form individual boxes or cartons. This view also includes a died-out box or carton blank having a fly leaf at one side and a fold-in flap at the opposite side.

Fig. 7 is a side elevation of Fig. 6.

Fig. 8 is a transverse vertical section of an impressed web folded at a single, i. e., middle, line of scoring directly upon itself, that is, without an insert ply.

Fig. 9 is a vertical elevation, largely diagrammatic, viewed from a position opposite to that of Fig. 4, showing the stage of passing the insert material through an adhesive bath and the subsequent step of applying the impressed web on opposite faces of the adhesive coated insert ply.

Fig. 10 is a detail transverse section on line 10—10 of Figs. 4 and 6.

Fig. 11 is a plan view of a box or carton blank having a fly leaf at one side of the blank.

Fig. 12 is a detail transverse section on line 12—12 of Fig. 11.

Fig. 1 generally indicates at 10 the web to be printed or otherwise impressed, preferably supplied from a roll 11. At 12 is represented a regulation multi-color printing machine, applicable for multi-color printing and/or other multiple impressions. At 13 is diagrammatically indicated any suitable scoring device, for scoring the web longitudinally to facilitate the subsequent operation of folding the impressed web upon itself at such scoring.

As to details appearing in Fig. 1, the roll 11 of web material is shown supported in a regulation bracket 14; at 15 is indicated a regulation feed-in roll device. At 16, 17, 18 and 19, etc. are indicated color printing and/or other impression units for applying the desired number of colored or other impressions. The stated device 13 is employed jointly as the feed-out roller mechanism as well as to score the web as above set forth.

At 10*a*, see Fig. 1 and Fig. 2, is indicated the impressed web, bearing the desired impressions, in this instance, see impressions 20, see Fig. 2, applicable to a box or carton for packaging and displaying chewing gum. At 10*c*, 10*c*, are indicated two longitudinal lines of scoring, each of which may, as shown, (see Fig. 3), crimp the web 10*a* in direction upwardly relatively to the impressed face of the web.

As above indicated, the impressed web may be folded and bonded upon its non-impressed faces directly, see Figs. 4 and 8, or upon opposing faces of an insert ply 22, see Fig. 5, which insert ply may be fed between the folded web 10*a* and the web 10*a* bonded at its non-impressed faces to such insert material 22.

The adhesive is applied, see indications 23, 23, Fig. 9, to the opposite faces of the insert material 22, in a suitable manner, as by passing a web of the insert material 22 through a bath of the adhesive, as indicated in Fig. 9, that is, over a roll 51, thence under the roll 52, submerged in the bath 53 of the adhesive, and discharged between the rolls 54, 54, which rolls 54, 54, are provided with scrapers 55, 55. Advantageously, the folding and bonding of the impressed web 10*a* is had by a succession of pairs of pressure rolls, see 24, 24, 25, 25, Figs. 4, 9, and 6.

The resulting multiple ply web is passed from the stated pressure rolls to suitable blank-scoring means and blank-cutting means. As is indicated in Figs. 6 and 7, the blank scoring operation may be effected by a scoring roll 26 and its cooperating impression roll 26*a*, and the blank cutting operation may be effected by a cutting roll 27, and its cooperating impression roll 27*a*.

Typical lines of scoring are indicated by 28, see Fig. 6. Typical lines of severing are indicated by 29.

The resulting blanks, see 10B, Fig. 6 may be stacked as is indicated in Fig. 7, as upon a receding platform 30.

The thickness of the web of the ply insert 22, if employed, is selected with reference to the thickness of the impressed web 10, to derive the desired eventual thickness of the box or carton blank, thus affording economy by proper selection of materials for the respective webs in accordance with the costs of the selected materials.

As appears from the individual box or carton blank, see 10B, Fig. 6, and also from Fig. 11, the edge 10*c* of the indicated fly leaf 10*d* is "rounded" and also finished, in that the web 10 extends about the stated edge when folded at the score lines 10*c*, see also Fig. 2. Obviously the edges resulting from folding at the score lines 28, disposed intermediate the resulting died-out blank, are also "rounded" and finished.

The more preferred forms of my invention provide for a "rounded" and finished edge at 10*e* as well as at the opposite edge 10*c*, namely, by folding the printed web 10*a* about both of its side edges, the original edges 10*f* of the full or single web, see Fig. 2, being ultimately located intermediate, see 10*f*, Figs. 6 and 10, the edges of the folded-over web. Desirably, but not necessarily, the original edges 10*f* are located substantially coincident with a scoring line 28. The portion 10*g* of the blank is a fold-in flap.

The parts of the blank shown in Figs. 11 and 12 corresponding to like parts of the blank shown in Figs. 6 and 10 are designated by like reference characters. The blank of Figs. 11 and 12 has a fly leaf 10*d* at one side, namely, adjacent the edge 10*d*, the edge 10*e* at the opposite side of the blank being an edge of a side of the box or carton, which edge 10*e* is "rounded" and finished.

In the employment of a web or other stock, folded upon itself and bonded directly at its non-impressed face, pursuant to my invention, the web or other stock may be coated or otherwise finished on one face only, upon which finished face the printing or other impressions are applied, thus effecting marked economy in the cost of web or other stock material in that the body of the web or other stock may be selected of low cost and further that such web or other stock is of but one-half thickness, and may be paper as distinguished from board, as well as effecting a saving by reason of the single operation of printing or impressing, namely, on one face only.

From the above it appears that my process effects positively exact register of all printed and/or other impressed matter appearing ultimately on opposite faces of the parts of the box or carton when set up.

It will be observed that the rounded and finished opposite side edges 10*c* and 10*e* are spaced from one another and with respect to the die of the desired box or carton blank, to locate such edges 10*c* and 10*e* within the contour of the die, that is to say, at the margins of the resulting box or carton.

My invention, as above appears, effects definite economy in the production of box or carton blanks by affording when desirable the use of insert material of low cost, by reason of the absence of the requirement of finished faces for such insert material, and further, by reason that such insert material may provide the major thickness of the resulting blank. In contradistinction from my invention, the prior practice of employing a single web of paper board for the eventual box or carton blank, such board is required to be finished on both faces and therefore of relatively high cost. Furthermore, such prior practice requires the printing or other impressions to be applied on its opposite faces, therefore necessitating two separate printing or impressing operations, namely, for each face, and in addition introduces the most difficult, and commercially most expensive problem of seeking register of the printed matter appearing on the opposite faces of the single web or other stock and resulting blank.

My invention provides further for the control of the degree of flexibility of the resulting multiple ply, whether with or without an insert ply, namely by proper selection and proper proportion of a flexible-imparting ingredient to the bonding medium. For example, glycerine may be added in proper proportion to an animal glue, or vegetable glues or other water solvent glue or other adhesive, whereby upon evaporation of the vaporizable constituent of the resulting bonding medium admixture, the glycerine or equivalent ingredient constitutes a part of the residue, i. e. resultant bonding medium. Similarly, other flexibility-imparting ingredient may be employed with the above stated or other types of glues or other adhesives.

Whereas, I have described my invention by reference to specific forms thereof, it will be understood that many changes and modifications may be made without departing from the spirit of the invention.

What I claim is:

1. The method of forming box and carton blanks bearing printed matter, which comprises imprinting one face of the web, folding the printed web upon itself and bonding the folded web at its thus reversed non-printed face, and dieing out the respective blanks from the thus folded web.

2. The method of forming box and carton blanks bearing printed matter, which comprises imprinting one face of the web, folding the printed web upon itself and bonding the folded web at its thus reversed non-printed face on opposite faces of an insert board, and dieing out the respective blanks from the thus folded web.

3. The method of forming box and carton blanks, each including a fly leaf and bearing printed matter on opposite faces of the blank inclusive of the fly leaf, which comprises imprinting one face of the web, folding the printed web upon itself and bonding the folded web at its thus reversed non-printed face, and dieing out the respective blanks from the thus folded web to include a fly leaf for each blank.

4. The method of forming box and carton blanks, each including a fly leaf and bearing printed matter on opposite faces of the blank inclusive of the fly leaf, which comprises imprinting one face of the web, folding the printed web upon itself and bonding the folded web at its thus reversed non-printed face on opposite faces of an insert board, and dieing out the respective blanks from the thus folded web to include a fly leaf for each blank.

5. The method of forming box and carton blanks bearing printed matter, which comprises imprinting one face of the web, folding the printed web doubly upon itself and bonding the folded web at its thus reversed non-printed face, and dieing out the respective blanks from the thus folded web.

6. The method of forming box and carton blanks bearing printed matter, which comprises imprinting one face of the web, folding the printed web doubly upon itself and bonding the folded web at its thus reversed non-printed face on opposite faces of an insert board, and dieing out the respective blanks from the thus folded web.

7. The method of forming box and carton blanks, each including a fly leaf and bearing printed matter on opposite faces of the blank inclusive of the fly leaf, which comprises imprinting one face of the web, folding the printed web doubly upon itself and bonding the folded web at its thus reversed non-printed face, and dieing out the respective blanks from the thus folded web to include a fly leaf for each blank.

8. The method of forming box and carton blanks, each including a fly leaf and bearing printed matter on opposite faces of the blank inclusive of the fly leaf which comprises imprinting one face of the web, folding the printed web doubly upon itself and bonding the folded web at its thus reversed non-printed face on opposite faces of an insert board, and dieing out the respective blanks from the thus folded web to include a fly leaf for each blank.

9. The method of forming box and carton blanks bearing printed matter, which comprises subjecting a web having but one finished face with the desired imprinting applied to such finished face, folding the printed web upon itself and bonding the folded web at its thus reversed non-printed face, and dieing out the respective blanks from the thus folded web.

10. The method of forming box and carton blanks bearing printed matter, which comprises subjecting a web having but one finished face with the desired imprinting applied to such finished face, folding the printed web upon itself and bonding the folded web at its thus reversed non-printed face on opposite faces of an insert board, and dieing out the respective blanks from the thus folded web.

11. The method of forming box and carton blanks, each including a fly leaf and bearing printed matter on opposite faces of the blank inclusive of the fly leaf, which comprises subjecting a web having but one finished face with the desired imprinting applied to such finished face, folding the printed web upon itself and bonding the folded web at its thus reversed non-printed face, and dieing out the respective blanks from the thus folded web to include a fly leaf for each blank.

12. The method of forming box and carton blanks, each including a fly leaf and bearing printed matter on opposite faces of the blank inclusive of the fly leaf, which comprises subjecting a web having but one finished face with the desired imprinting applied to such finished face, folding the printed web upon itself and bonding the folded web at its thus reversed non-printed face on opposite faces of an insert board, and dieing out the respective blanks from the thus folded web to include a fly leaf for each blank.

13. A box or carton blank comprising a multiple ply of stock bearing printing on one face only, the stock being folded upon itself and bonded at its non-printed face.

14. A box or carton blank comprising a multiple ply of stock bearing printing on one face only, the stock being folded doubly upon itself and bonded at its non-printed face.

15. A box or carton blank bearing printed matter on opposite faces, said blank being formed of an interbonded multiple ply of stock bearing printed matter on one face only.

16. A box or carton blank bearing printed matter on opposite faces in register with one another, formed of an interbonded multiple ply of stock bearing printing on one face only.

17. A box or carton blank bearing printed matter on opposite faces in register with one another, comprising an interbonded multiple ply and stock bearing printing on one face only, said stock being applied at its non-printed face to opposite faces of said inner ply.

18. A box or carton blank bearing printed matter on opposite faces in register with one another, formed of a multiple ply comprising a body of paper stock and finished material on one face only, the printed matter being applied to such finish face, the aforesaid being folded upon the ends and bonded at its non-printed face.

19. A method of forming multiple ply blanks bearing printed matter in register on both faces thereof, which comprises imprinting one face of a web with matter that will appear in register on both sides of the finished blank when the web is subsequently folded and bonded, folding the printed web upon itself with the printed matter facing outwardly, bonding the folded web at its thus reversed and unprinted face, and dieing out the respective blanks from the thus printed, folded and bonded web.

WILLIAM F. GRUPE.